United States Patent
Yildiz et al.

(10) Patent No.: US 11,989,664 B2
(45) Date of Patent: May 21, 2024

(54) SYSTEM AND METHOD FOR CALCULATING BATTERY LIFE

(71) Applicant: Dell Products L.P., Round Rock, TX (US)

(72) Inventors: Yagiz C. Yildiz, Austin, TX (US); Ryan N. Comer, Pflugerville, TX (US); Jace W. Files, Round Rock, TX (US); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 792 days.

(21) Appl. No.: 17/155,932

(22) Filed: Jan. 22, 2021

(65) Prior Publication Data

US 2022/0237479 A1 Jul. 28, 2022

(51) Int. Cl.

| | |
|---|---|
| *G06F 1/00* | (2006.01) |
| *G06F 1/3218* | (2019.01) |
| *G06F 16/23* | (2019.01) |
| *G06F 16/2458* | (2019.01) |
| *G06N 5/04* | (2023.01) |
| *G06N 20/00* | (2019.01) |

(Continued)

(52) U.S. Cl.
CPC .............. *G06N 5/04* (2013.01); *G06F 1/3218* (2013.01); *G06F 16/2379* (2019.01); *G06F 16/2474* (2019.01); *G06N 20/00* (2019.01); *G06F 1/26* (2013.01); *G06F 1/3203* (2013.01)

(58) Field of Classification Search
CPC ........ G06N 5/04; G06N 20/00; G06F 1/3218; G06F 16/2379; G06F 16/2474; G06F 1/26; G06F 11/3041; G06F 11/3058; G06F 11/008

USPC .......................................................... 713/323
See application file for complete search history.

(56) References Cited

U.S. PATENT DOCUMENTS

| | | | | |
|---|---|---|---|---|
| 2017/0358275 | A1* | 12/2017 | Klement | G06F 16/951 |
| 2020/0388215 | A1* | 12/2020 | Kam | G09G 3/3291 |

(Continued)

OTHER PUBLICATIONS

Wang, Zhihua. *Time series matching: a multi-filter approach*. Diss. New York University, Graduate School of Arts and Science, 2006.

(Continued)

*Primary Examiner* — Volvick Derose
(74) *Attorney, Agent, or Firm* — McDermott Will & Emery LLP

(57) ABSTRACT

A system and method for predicting remaining battery life for a portable information handling systems include determining power consumption for an OLED display based on an on pixel ratio (OPR) for each pixel. When a user starts a session of an application and a file, file metadata may be used to search a database storing OPR profiles, with each OPR profile including one or more time series associated with one or more instances of the application executing the file. For static files, a time series in an OPR profile may be used to predict power consumption and calculate battery life. For dynamic files, periodically measuring OPR data may be used to predict power consumption. For some dynamic files, historic OPR values and periodic measurements may be used to predict power consumption. The user may be provided with a list of files usable during the calculated battery life.

18 Claims, 4 Drawing Sheets

(51) Int. Cl.
　　　*G06F 1/26*　　　(2006.01)
　　　*G06F 1/3203*　　(2019.01)

(56) References Cited

U.S. PATENT DOCUMENTS

2020/0404092 A1* 12/2020 Sun ..................... H04N 1/0097
2024/0046874 A1*  2/2024 Bai ..................... G09G 3/3233

OTHER PUBLICATIONS

SMBus 4-Channel Wide Dynamic Range Power Accumulator—MAX34407, Maxim Integrated, 2017.

* cited by examiner

SYSTEM AND METHOD FOR CALCULATING BATTERY LIFE

BACKGROUND

Field of the Disclosure

This disclosure relates generally to portable information handling systems and, more particularly, to systems for predicting battery life and generating recommendations for a user based on a predicted battery life.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Batteries and longer battery life are important for a better user experience. There has been significant work to improve battery life and provide better estimates of remaining life. Battery life estimation is typically calculated by assessing the power consumption at a particular moment (such as when a user clicks on the battery indicator) and extrapolating the power consumption to estimate the battery life. This approach assumes the user will continue to do what they were doing until the battery dies.

SUMMARY

Embodiments disclosed herein may be generally directed to methods and systems for predicting battery life using on pixel ratio (OPR) calculations.

Embodiments of a battery life prediction system may comprise a combination of software service and a database solution that records and manages OPR profiles per content type and interfaces battery life calculation engines to share the display's current power consumption and predict future power consumption. Embodiments may compare the content type (Game, Productivity, Movie) to use an existing OPR profile or create a new OPR profile if there is no previous profile that matches the workload. A new profile for a content may be created automatically if the content is passive (video clip) or created based on the real-time recording of selected data points.

Embodiments may be directed to a method for predicting a battery life in a portable information handling system. The method may begin in response to a user initiating a session on the portable information handling system, wherein the user provides an indication of an application to be executed by the information handling system and a file associated with the application. The method may include searching a set of on-pixel ratio (OPR) profiles in a database to determine if an OPR profile for the file is stored in the database, wherein each stored OPR profile comprises one or more stored time series, wherein each stored time series corresponds to one instance of the application processing the file. During execution of the application, the method includes determining OPR values to generate a session time series associated with the file and comparing the session time series to a stored time series to determine if the session time series matches the stored time series.

If the session time series matches the stored time series, the method may include predicting a set of OPR values for the file based on a set of historic OPR values from the stored time series. If the session time series does not match the stored time series, the method may include predicting the set of OPR values for the file using data forecasting applied to the measured OPR values. Embodiments of the method may include calculating a power prediction for the file based on the predicted set of OPR values and predicting a battery life based on a battery charge and the power prediction for the file.

In some embodiments, determining a set of on-pixel ratio (OPR) profiles in a database to determine if an OPR profile for the file is stored in the database comprises comparing file metadata for the file with OPR profile metadata.

In some embodiments, determining OPR values for the file to generate a session time series comprises determining a file type. If the file type is static, the method may comprise reading frame data for the file to determine the session time series. If the file type is dynamic, the method may comprise periodically measuring OPR values to create the session time series.

In some embodiments, comparing the session time series to a stored time series comprises determining a confidence level to determine if the session time series matches the stored time series. Determining a confidence level may comprise comparing a relative values of a brightness level and a color level of the session time series to relative values of a brightness level and a color level of the stored time series. In some embodiments, the method includes determining a list of applications or files executable by the portable information handling system for the predicted battery life or displaying one or more of a notification of the predicted battery life or a list of applications or files executable by the portable information handling system for the predicted battery life.

Embodiments of a system for predicting battery life for a battery in a portable information handling system may include a processor and a memory medium in the portable information handling system, the memory medium comprising a set of instructions. The instructions are executable by the processor to cause the processor to initiate a session on the portable information handling system, wherein the input includes an indication of an application to be executed by the information handling system and a file associated with the application in response to receiving an input from a user interface. The instructions are executable by the processor to cause the processor to search a set of on-pixel ratio (OPR) profiles in a database in the memory medium to determine if an OPR profile for the file is stored in the database, wherein each stored OPR profile comprises one or more stored time series, wherein each stored time series corresponds to one instance of the application processing the file. During execution of the application, instructions are executable by the processor to cause the processor to determine OPR values to generate a session time series associated with the file and compare the session time series to a stored time series to determine if the session time series matches the stored time series. If the session time series matches the stored time series, the processor is configured to predict a set of OPR values for the file based on a set of historic OPR values from the stored time series. If the session time series does not match the stored time series, the processor is configured to predict the set of OPR values for the file using data forecasting applied to the determined OPR values. The processor is further configured to calculate a power prediction for the file based on the predicted set of OPR values and predict a battery life based on a battery charge and the power prediction for the file.

In some embodiments, the set of instructions are executable by the processor to cause the processor to compare file metadata for the file with OPR profile metadata for each OPR profile to determine if an OPR profile for the file is stored in the database.

In some embodiments, the set of instructions are executable by the processor to cause the processor to determine a file type. If the file type is static, the set of instructions are executable by the processor to cause the processor to read frame data for the file to determine the session time series. If the file type is dynamic, the set of instructions are executable by the processor to cause the processor to periodically measure OPR data to determine the session time series. In some embodiments, the set of instructions are executable by the processor to cause the processor to determine a confidence level to determine if the session time series matches the stored time series. In some embodiments, the set of instructions are executable by the processor to cause the processor to compare relative values for a brightness level and a color level of the session time series to relative values of a brightness level and a color level of the stored time series to determine the confidence level.

In some embodiments, the set of instructions are executable by the processor to cause the processor to update the OPR file in the database based on the session time series if the content type is static. In some embodiments, the set of instructions are executable by the processor to cause the processor to measure the OPR values and add the session time series to the OPR profile if the file type is dynamic.

In some embodiments, the set of instructions are executable by the processor to cause the processor to determine a list of applications or files executable by the portable information handling system for the predicted battery life. In some embodiments, the set of instructions are executable by the processor to cause the processor to display one or more of a notification of the predicted battery life or a list of applications or files executable by the portable information handling system for the predicted battery life.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1:
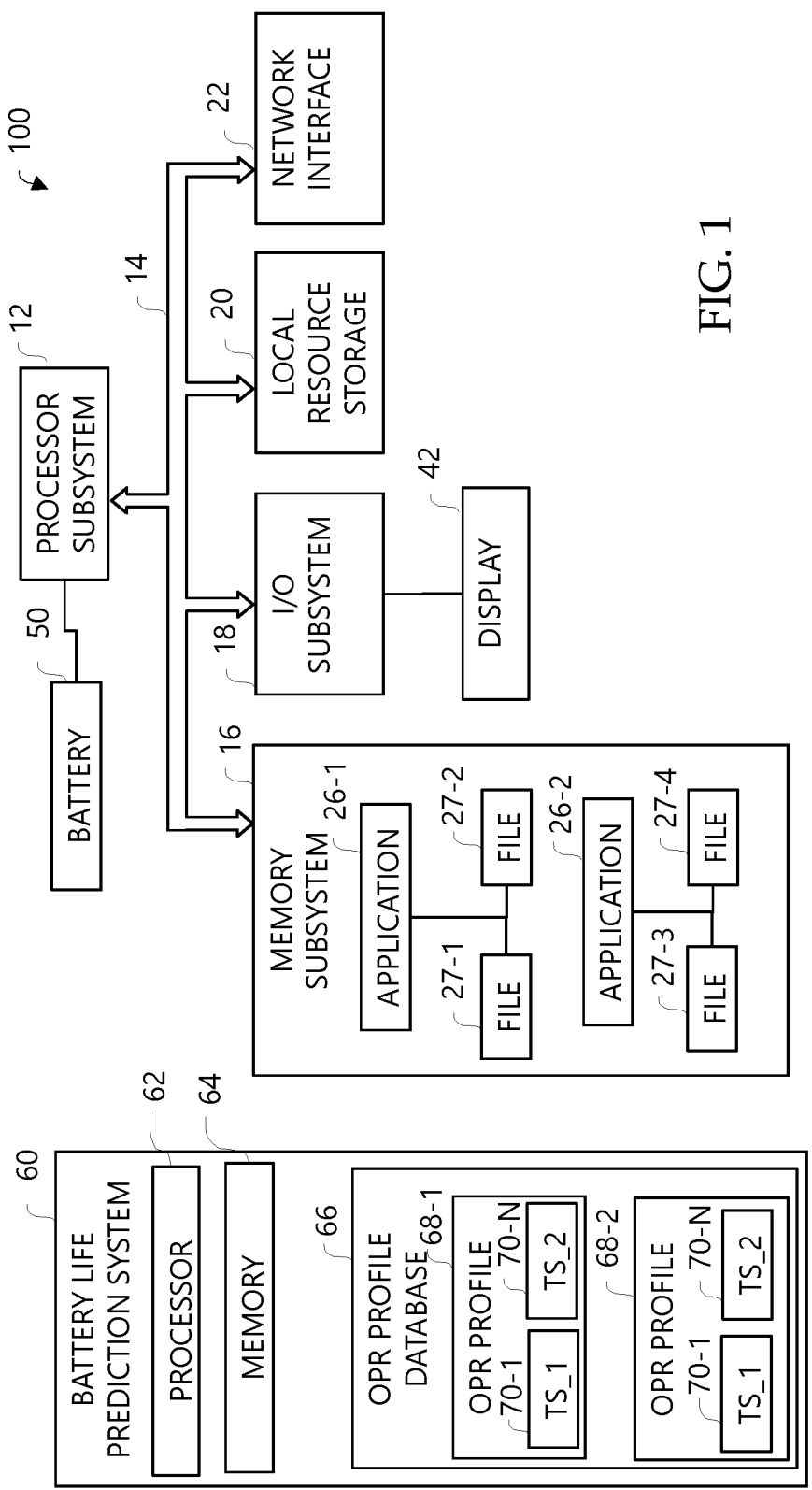
FIG. 1 is a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, application "26-1" refers to an instance of an application, which may be referred to collectively as applications "26" and any one of which may be referred to generically as application "26."

For the purposes of this disclosure, a portable information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, a portable information handling system may be a laptop, a tablet, a 2-in-1 tablet, or another suitable device and may vary in size, shape, performance, functionality, and price. The portable information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The portable information handling system may also include one or more buses operable to transmit communication between the various hardware components.

In portable information handling systems, the largest contributor to active battery consumption is the display subsystem, especially in organic light-emitting diode (OLED) systems. Embodiments disclosed herein include a portable information handling system with a system for predicting a remaining battery life using On Pixel Ratio (OPR) calculations and a present battery charge. Embodiments may use a software service that correlates a file type with accurate OLED OPR values to provide the user with the most accurate battery life estimate. Embodiments may predict a power consumption of an OLED panel with active and/or passive content. OPR power predictions may depend on specific display parameters for higher accuracy.

Embodiments disclosed herein are described with respect to portable information handling systems with OLED displays. Particular embodiments are best understood by reference to FIGS. 1-4, wherein like numbers are used to indicate like and corresponding parts.

Turning to the drawings, FIG. 1 illustrates a block diagram depicting selected elements of an embodiment of portable information handling system 100. It is noted that FIG. 1 is not drawn to scale but is a schematic illustration.

As shown in FIG. 1, components of portable information handling system 100 may include, but are not limited to, a processor subsystem 12, which may comprise one or more processors, and a system bus 14 that communicatively couples various system components to processor subsystem 12 including, for example, a memory subsystem 16, an I/O subsystem 18, local storage resource 20, and network interface 22. Information handling system 100 may further include battery 50 and battery life prediction system 60.

Processor subsystem 12 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 12 may interpret and execute program instructions and process data stored locally (e.g., in memory subsystem 16). In the same or alternative embodiments, processor subsystem 12 may interpret and execute program instructions and process data stored remotely (e.g., in a network storage resource).

System bus 14 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Memory subsystem 16 may comprise a system, device, or apparatus operable to retain and retrieve program instructions and data for a period of time (e.g., computer-readable media). Memory subsystem 16 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Memory subsystem 16 may store one or more applications 26. Each application 26 may be associated with or execute one or more files 27, For example, application 26-1 may be a video processing application for executing movie file 27-1 to display a first movie or movie file 27-2 to display a second movie. Application 26-2 may be, for example, a word processing application for executing a first file 27-3 associated with a letter template or file 27-4 associated with a general document template. Other applications 26 may be executed for Internet browsing, online gaming, or other processing by information handling system 100.

In information handling system 100, I/O subsystem 18 may comprise a system, device, or apparatus generally operable to receive and transmit data to or from or within information handling system 100. I/O subsystem 18 may represent, for example, a variety of communication interfaces, graphics interfaces, video interfaces, user input interfaces, and peripheral interfaces. In various embodiments, I/O subsystem 18 may be used to support various peripheral devices, such as display 42, a keyboard, a touch pad, or a camera, among other examples. In some implementations, I/O subsystem 18 may support so-called 'plug and play' connectivity to external devices, in which the external devices may be added or removed while information handling system 100 is operating.

Local storage resource 20 may comprise computer-readable media (e.g., hard disk drive, floppy disk drive, CD-ROM, and other type of rotating storage media, flash memory, EEPROM, or another type of solid-state storage media) and may be generally operable to store instructions and data.

Network interface 22 may be a suitable system, apparatus, or device operable to serve as an interface between information handling system 100 and a network (not shown). Network interface 22 may enable information handling system 100 to communicate over a network using a suitable transmission protocol or standard. In some embodiments, network interface 22 may be communicatively coupled via a network to a network storage resource (not shown). A network coupled to network interface 22 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to network interface 22 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to network interface 22 or various components associated therewith may be implemented using hardware, software, or any combination thereof.

Battery life prediction system 60 comprises processor 62 and memory 64 comprising instructions executable by processor 62. Battery life prediction system 60 also comprises OPR profile database 66 storing a set of OPR profiles 68 (e.g., OPR profiles 68-1 to 68-N), wherein each OPR profile 68 includes one or more time series 70 (e.g. time series 70-1 to time series 70-N), discussed in greater detail below. Battery life prediction system 60 may monitor components of information handling system 100 and predict battery life for battery 50 based on power consumed by components. In some embodiments, battery life prediction system 60 monitors OPR values for display 42 to predict battery life for battery 50 based on an application 26 executing on processor subsystem 12. In some embodiments, battery life prediction system 60 monitors OPR values for display 42 based on one or more applications 26 executing one or more files 27 on processor subsystem 12. As depicted in FIG. 1, processor 62 may be separate from processor subsystem 12 and memory 64 may be separate from memory subsystem 16. In some embodiments, processor 62 may be part of processor subsystem 12 and memory 64 may be part of memory subsystem 16. The set of instructions may be part of an application programming interface (API) executable by processor 62.

Displays

Portable information handling systems 100 have traditionally used liquid crystal diode (LCD) displays. More recently, OLED displays 42 are getting widely adopted in the industry. OLED displays 42 are lighter and use direct lighting for better resolution and performance than LCDs but require more power. In an OLED display 42, each pixel may have red, blue and green (RGB) subpixels that may be controlled to display a desired color and brightness. Each subpixel may have a certain weight (e.g., red—10%, green—30%, blue—20%) which causes the pixel to display a particular color. As the RGB subpixels change, the color and brightness of the pixel change. An on pixel ratio (OPR) indicates how hard the pixels are being driven. For example, to display a white screen at full brightness on display 42, all pixels are driven at 100% (i.e., red—100%, green—100%, blue—100%) and the OPR is 100%. To display a gray screen, the OPR may be only 50%. The higher the OPR, the higher the power consumption.

Measuring Display Power Consumption in an Oled Display

Due to the increased power consumption by OLED displays 42, accurately estimating the power consumption of an OLED display 42 is crucial for predicting the remaining battery life correctly. In portable information handling systems 100, OLED display power consumption can be 40-50% of the overall system power consumption. However, many approaches to measuring display power consumption rely on older software models developed for LCD displays with smaller power consumption. These software models may be sufficient for an LCD display with lower total power consumption, but these models do not account for variations in the type of OLED display 42 or other characteristics of OLED displays 42. For example, some approaches determine an average power consumption for the last 5-10 seconds and project the remaining battery life based on this prediction. These software models can have serious inaccuracies. For example, if the user just powered on the information handling system 100, there is little information on which to predict power consumption. Also, if the user was just using an application that required little power and switches to an application that will require more power, these software models will underestimate the amount of power needed and therefore overestimate the remaining battery life. An alternative to using software models is to use a physical "power meter" chip on a display power rail on a motherboard that helps calculate the power consumption more accurately. However, power meters may be inaccurate for OLED displays 42 due to a wide range of current load, particularly when display 42 is displaying dynamic content. Also, power meters require additional area on a board, add manufacturing complexity and cost to information handling system 100 and may introduce noise or other unwanted effects.

Using OPR Calculations for Estimating Power Consumption

Embodiments disclosed herein may perform on pixel ratio (OPR) calculations for more accurate predictions of remaining battery life by improving the accuracy of the display's contribution to the power consumption of a portable information handling system 100. Embodiments may further provide recommendations to allow a user to maximize the amount of content that portable information handling system 100 may display for a predicted battery life.

Figure 2:
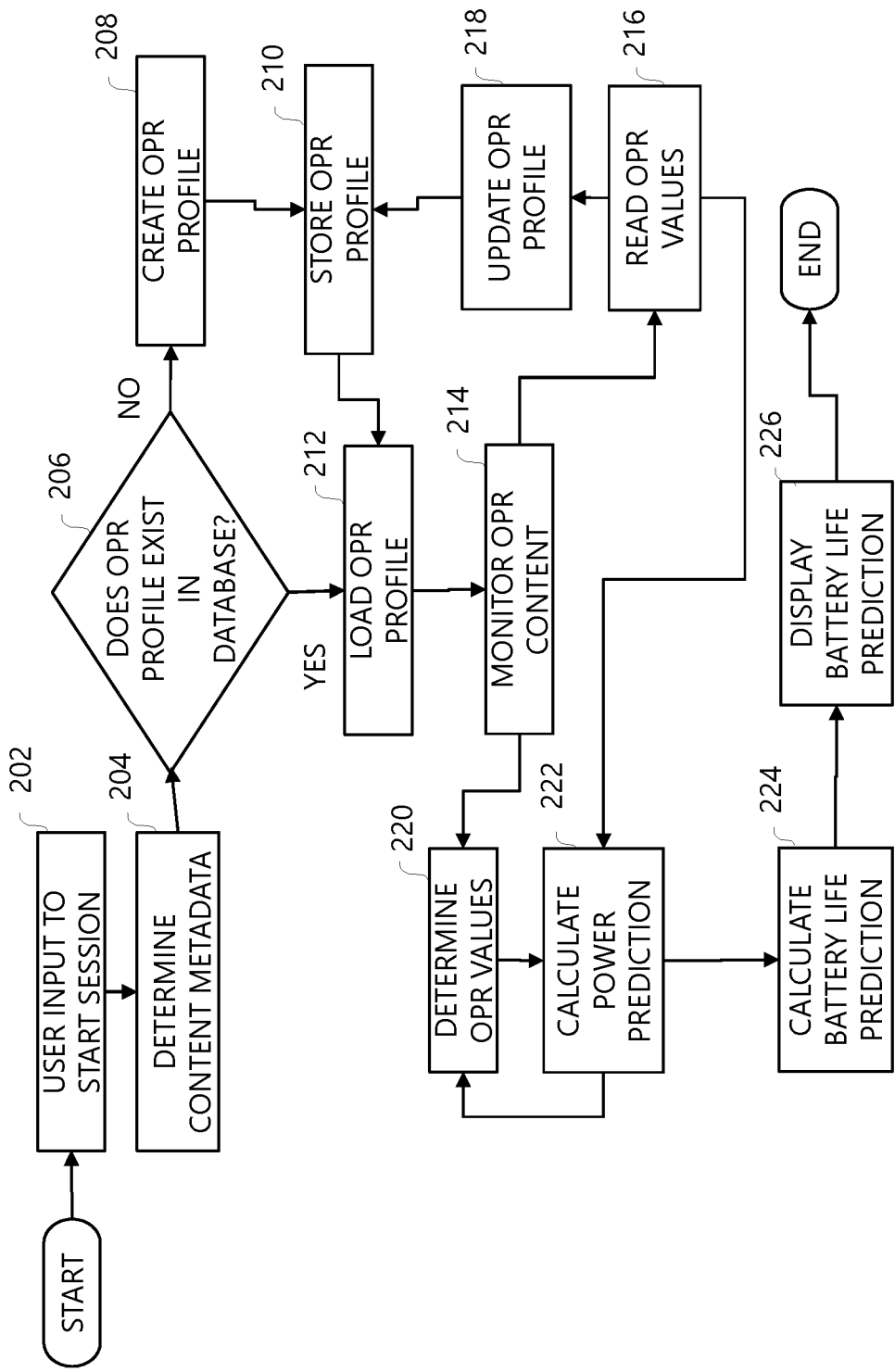
FIG. 2 is a flow diagram of a process for predicting battery life in the portable information handling system of FIG. 1 using OPR monitoring.

Referring to FIG. 2, embodiments may include a method for predicting battery life for portable information handling system 100 based on OPR monitoring. In some embodiments, processor 62 executes instructions stored in memory 64 to monitor OPR values to provide a user with the most accurate battery life estimate for key use cases.

At step 202, a user provides input including an indication to start a session. A session may refer to a time period needed for the user to experience the content associated with a file 27. The indication may be a physical indication, such as a DVD door closing, or may be a software indication, such as the user clicking on a browser icon to start a browsing session, clicking on a movie file icon to cause a video application 26 to play a movie file 27 or clicking on a word processing application icon to cause the word processing application 26 to open a file 27. The session may comprise a time period for the user to watch a movie, play a video game, use a browser, email someone, perform document processing or otherwise use information handling system 100 to execute application 26 to process a file 27.

At step 204, embodiments may determine content metadata for a file 27 associated with application 26. Determining content metadata may include determining application 26 running on portable information handling system 100 and a name or title of file 27. Content metadata may include a name, a file type, a file size, etc. For example, in response to a user clicking on a movie file icon to watch a movie, embodiments may instantiate the application 26 and also determine content metadata such as a title of the movie, a play time (e.g., 2 hours), or a file size (e.g., 4 MB) for the file 27. A database structure may include an OPR profile 68 comprising content type, name, time series sessions and other content data. A content type may include a label such as "Movie", "Game", "Browser", "Other" or "Stream" such that a processor may read the label and determine a file type. Other information in an OPR profile 68 may include a vendor or model associated with display 42 and a brightness level.

At step 206, embodiments determine if an OPR profile 68 corresponding to an application 26 or file 27 exists in OPR profile database 66. Each OPR profile 68 stored in OPR profile database 66 comprises one or more time series 70. A time series is a group of data points that are captured periodically as the user is running content. Each data point comprises an OPR value and the timestamp that the OPR value occurred. After a session is complete, a new time series 70 is created, which captures the OPR values and screen brightness throughout the entire session, wherein each time series 70 corresponds to a single session needed by the user to experience content in the file 27. Time series information per session may be recorded in OPR profiles 68 organized by content type, title, etc. Information or metadata for time series 70 may include seconds from start, OPR readings, screen brightness and session date.

At step 208, if an OPR profile 68 corresponding to file 27 does not exist in OPR profile database 66, embodiments create a new OPR profile 68 and store the OPR profile 68 in OPR profile database 66. For example, the first time a user watches a movie stored in file 27, embodiments may create a new OPR profile 68 for the file 27 and include metadata such as a title of the movie. Similarly, the first time a user accesses a word processing application 26, an Internet browser, or provides an input of some other application 26 or file 27, embodiments may create a new OPR profile 68 and store the new OPR profile 68 in OPR profile database 66.

At step 212, if an OPR profile 68 corresponding to file 27 exists in OPR profile database 66, embodiments load the OPR profile 68 from OPR profile database 66. Loading the OPR profile 68 may comprise loading a time series 70 for OPR profile 68. For example, if a user watches a movie four different times, embodiments may select a time series 70 corresponding to one of the four time series 70 associated with the four times the user watched the movie.

At step 214, during execution of application 26 associated with file 27, embodiments may perform content OPR monitoring of display 42. In some embodiments, if more than one application 26 is running on information handling system 100, only one application 26 is used for OPR monitoring and battery life prediction system 60 may switch monitoring if the user switches applications 26. For example, if the user is watching a movie and gets an email notification, embodiments may switch OPR monitoring of display 42 based on a video application (e.g., application 26-1) processing movie file (e.g., file 27-1) to OPR monitoring of display 42 based on an email application (e.g., application 26-2) processing an email file (e.g., file 27-3). OPR content monitoring may include determining if the OPR content includes frames containing OPR values.

At step 216, in some embodiments, processor 62 may read OPR values. During execution of an application 26 associated with a file 27, information handling system may access a frame containing OPR values to read OPR values.

At step 218, embodiments may update an OPR profile 68 in OPR profile database 66. Updating an OPR profile 68 may include updating a time series 70 or adding a timeseries 70 to the OPR profile 68. If application 26 executes file 27 under the same conditions as a previous instance, the OPR values may be the same. If the conditions change, the OPR values may change. For example, the OPR values for a movie file 27 may differ if the user is watching the movie outside during the day or at night but may be the same (or nearly the same) if the user only watches the movie 27 inside under the same lighting conditions.

At step 220, embodiments determine OPR values for display 42. For dynamic content files, OPR values may be received as content is being presented to display 42. For example, when information handling system 100 is processing streaming content, OPR values may be communicated to display 42 before or at the same time as they are communicated to processor 62. In some embodiments, OPR values are determined periodically, such as every 5 seconds. The poll rate at which OPR values are determined may be based on application 26 or file 27 processed by application 26. For example, a poll rate for an email application 26 may be every 30 seconds and a poll rate for a streaming video application 26 may be every 5 seconds.

At step 222, embodiments calculate an OPR power prediction of how much power display 42 will consume to complete the session. An OPR power prediction may be based on OPR values corresponding to application 26 processing file 27.

At step 224, embodiments may calculate a battery life prediction based on the set of future OPR values.

At step 226, embodiments may display a battery life prediction.

Figure 3:
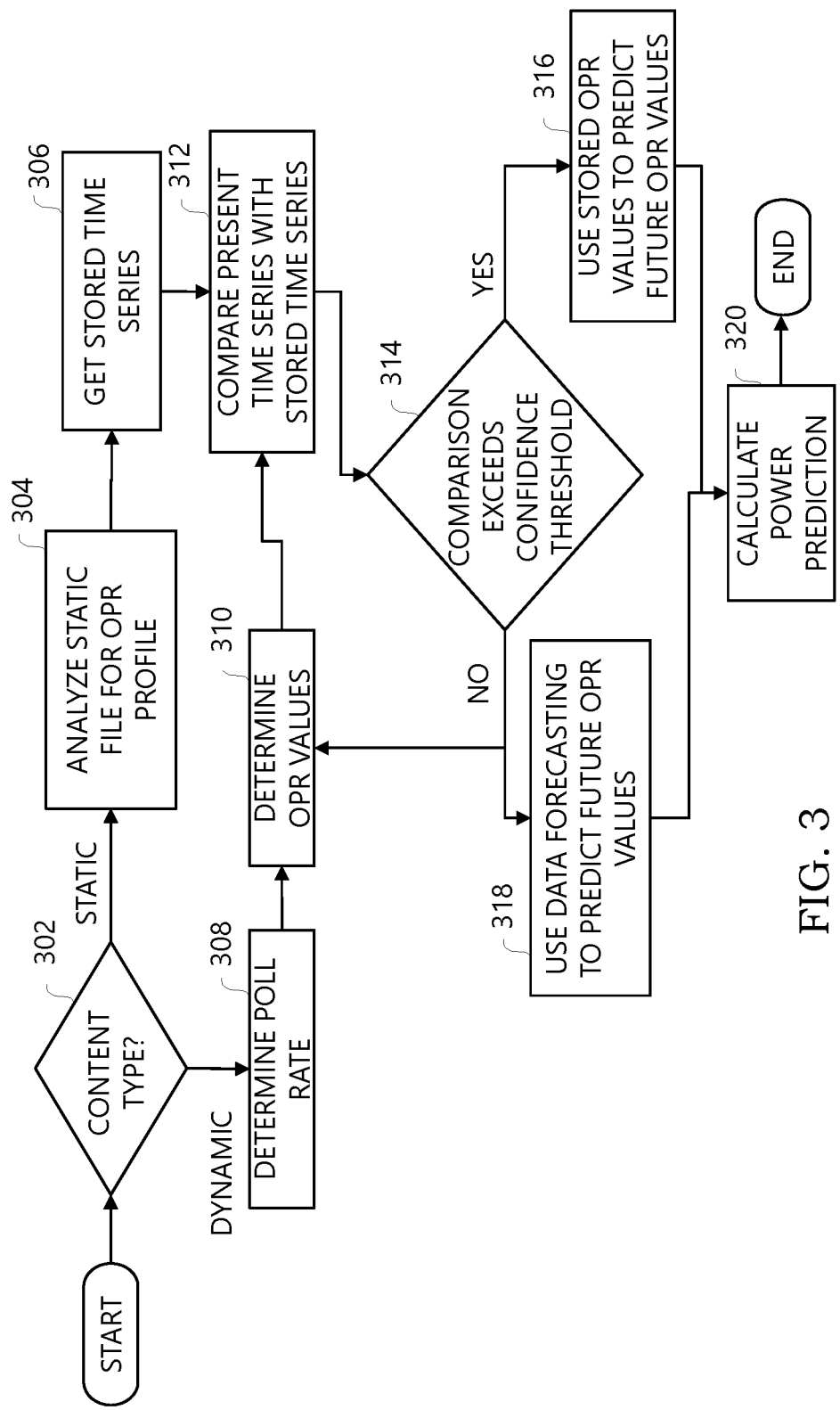
FIG. 3 is a flow diagram of a process for OPR monitoring for static and dynamic files in the portable information handling system of FIG. 1.

OPR monitoring is capable of determining the power consumption of an OLED display 42 at least as accurately as a hardware power meter for both passive and active content. Monitoring OPR values may require different steps for static and dynamic files 27. Referring to step 214, FIG. 3 depicts a process flow diagram for monitoring OPR content to determine if stored OPR values may be used to accurately predict future OPR values or if OPR power predictions require additional calculations.

At step 302, embodiments determine a file type for file 27. Determining a file type may comprise processor 62 reading metadata for a file 27. A file type may be static, wherein the content in the file 27 does not change. For example, an image (e.g., jpeg file) file 27 does not change. Similarly, a movie file 27 does not change (even though the movie might be considered dynamic content). For static files 27, all the future frames for the file 27 may be recorded such that all the OPR values for the file 27 are known. As another example, a file 27 downloadable using a browser may have information for frame buffering and embodiments may treat the file 27 as static because the file content does not change. Thus, even a file 27 associated with "streaming" may be considered a static type if the file contents do not change. A file type may be dynamic, wherein the contents of the file can change. For example, a game file may be considered a dynamic file because each time the user plays the game, a session associated with playing the game may change. The game may have multiple levels such that multiple sessions may have different outcomes and time periods needed to complete the game. As another example, an Internet browsing file may be dynamic because the user may visit different websites and interact with a browser application 26 differently each session.

If the file type is a static file type, then at step 304, embodiments may analyze file 27 for an OPR profile 68. An OPR profile 68 comprises one or more time series 70 for completing one or more sessions of application 26 processing file 27.

At step 306, embodiments may determine a stored time series 70 for the file 27. In some embodiments, determining an time series 70 for a file 27 comprises comparing conditions for a stored time series 70 in an OPR profile 68 with present conditions. For example, if the present conditions include information handling system 100 being indoors, a stored time series 70 for a session completed indoors may be more accurate than a stored time series 70 for a session completed outdoors.

If the file type is a dynamic file type, then at step 308, embodiments may determine a poll rate for getting OPR values for file 27. A poll rate may refer to the frequency that OPR values are read or measured.

At step 310, embodiments may periodically determine OPR values and create a session time series 70 using the OPR values.

At step 312, embodiments compare the session time series 70 with the stored time series 70.

At step 314, embodiments determine of the comparison exceeds a confidence threshold. In a static file scenario such as watching movies, the session time series may be precalculated with almost 100% accuracy for the duration of the movie, no matter what part of the movie a user starts from. In a more dynamic file scenario such as gaming, web browsing or office productivity, the session time series may be calculated through collected OPR data. In addition, the recorded time series information can be used as a contextual information by battery life prediction system 60 to predict the time that the user will spend on a particular content (how long does a user play a particular game or app per session). For example, for a game with multiple levels, each level may have different lighting, etc., that will determine the OPR values in a time series 70. So, the time series data for all instances of a first level may differ from the time series data for instances of a second level, a third level, etc. Similarly, if a user watches a movie a first time in broad daylight and watches the same movie a second time after dark, the OPR values may differ. Embodiments may compare a session time series with a stored time series 70 to determine if a comparison of relative values exceeds a confidence level. A confidence threshold may be based on, for example, a file type for file 27 or an application 26 processing file 27.

At step 316, if the comparison between the session time series 70 and the stored time series 70 exceeds the confidence threshold, embodiments may determine the session time series 70 matches the stored time series 70 and use historic OPR values from the OPR profile 68 to predict future OPR values for predicting the power needed to complete the session. If the patterns of the OPR values in the session time series 70 are similar to OPR values in historic time series 70, then the OPR values of the stored time series 70 may be used to predict the future OPR values of the session time series 70.

At step 318, if the comparison between the session time series 70 and the stored time series 70 is less than the confidence threshold, embodiments may determine the session time series 70 does not match the stored time series 70 and use data forecasting techniques on the session time series 70 to predict future OPR values for the session. Embodiments may continue using steps 310, 312, 314 and 318 to predict future OPR values or until the comparison between the session time series 70 matches the stored time series 70. In some embodiments, if the session time series 70 does not match the stored time series 70, forecasting may be based on session OPR values and a similar stored time series 70 or a stored OPR profile 68.

At step 320, embodiments calculate a power prediction for the portable information handling system 100 to complete the session. Utilization of the OPR values in conjunction with a stored time series 70 allows embodiments to predict the power consumption of the display subsystem with very high accuracy. If a stored OPR profile 68 matches the current content, a stored time series 70 in the OPR profile 68 may be used to calculate the future power consumption of the display 42.

Recommendation of Files or Applications Based on Predicted Power Consumption

A user may want to watch a movie but might not realize they do not have enough battery life to watch the whole movie. Embodiments may recommend a movie based on the available battery life and the OPR profile 68 associated with the file 27.

Figure 4:
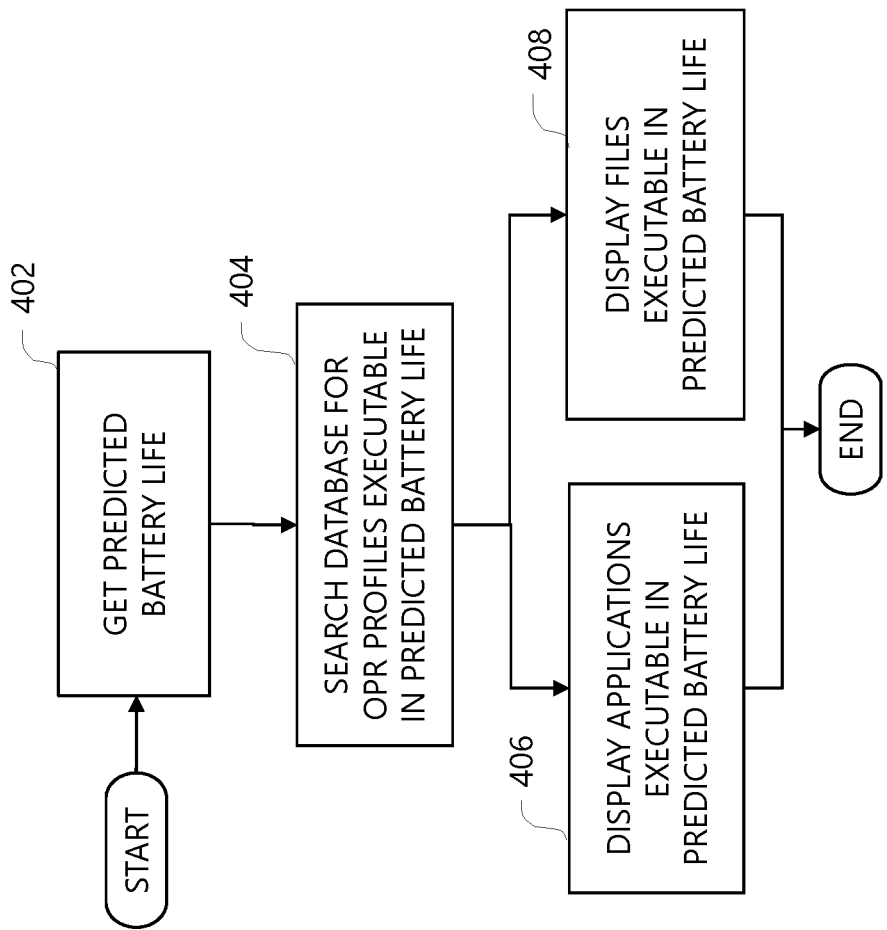
FIG. 4 is a flow diagram of a process for presenting a set of applications or files executable in a predicted battery life in the portable information handling system of FIG. 1.

Referring to FIG. 4, embodiments may use the calculated power prediction determined in the process depicted in FIGS. 2 and 3 as a basis to recommend files 27 or applications 26 executable on portable information handling system 100.

Embodiments may use the information from FIGS. 2 and 3 to identify content based on OPR profiles 68 in order to recommend a file 27 or an application 26 with lower OPR values or a temporary switch to the dark mode. This can be named as "backward battery management", where instead of managing the system resources to cater the content, content is picked to best cater the system resources (e.g., the battery life).

At step 402, embodiments get the predicted battery life using the process depicted in FIGS. 2 and 3.

At step 404, embodiments search OPR profile database 66 for a set of OPR profiles 68 having a time series 70 corresponding to an application 26 or file 27 that would be executable within the predicted battery life. For example, a user just boarded plane for 4 hours and wants to watch some movies, but based on a battery charge of 10 Watts (W), display 42 must use less than 2.5 W/hr for the system battery to last 4 hours. If other components in the portable information handling system 100 are using 1.5 Watts/hour, display 42 is limited to using 1 Watt/hour and embodiments may search OPR profile database 66 for a set of OPR profiles 68 corresponding to applications 26 or files 27 executable using less than 1 Watt/hour.

At step 406, embodiments display a set of applications 26 that would be executable within the predicted battery life. A first application 26 may be associated with multiple time series 70 that indicate the power needed to display a file 27 processed by application 26 will exceed the predicted battery life and might not be displayed.

At step 408, embodiments display a set of files 27 that would be executable within the predicted battery life. For example, movies play for different times and have different brightness levels, such that a first movie file 27 with a runtime of 2 hours but uses darker colors and lower brightness may be displayed. However, a second movie with a shorter runtime may use brighter colors such that it could not be viewed in its entirety might not be displayed.

When the set of applications 26 or files 27 are displayed to the user, the user is able to select the application 26 or file 27 knowing they will be able to complete a session without worrying if portable information handling system 100 will have enough power to complete the session.

In some embodiments, battery life prediction system 60 or portable information handling system 100 may be configured to communicate OPR profiles 68 with a centralized server (not shown) to apply artificial intelligence (AI)/machine learning (ML) training to better predict the power consumption of dynamic content, create a large library of passive content profiles or to track the display aging/usage. This information may be included in the metadata for files 27.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method for predicting a battery life in a portable information handling system, the method comprising:
   in response to a user initiating a session on the portable information handling system, wherein the user provides an indication of an application to be executed by the information handling system and a file associated with the application:
   searching a set of on-pixel ratio (OPR) profiles in a database to determine if an OPR profile for the file is stored in the database, wherein each stored OPR profile comprises one or more stored time series, wherein each stored time series corresponds to one instance of the application processing the file;
   during execution of the application, determining OPR values to generate a session time series associated with the file;
   comparing the session time series to a stored time series to determine if the session time series matches the stored time series, wherein:
   if the session time series matches the stored time series, predicting a set of OPR values for the file based on a set of historic OPR values from the stored time series; or
   if the session time series does not match the stored time series, predicting the set of OPR values for the file using data forecasting applied to the measured OPR values;
   calculating a power prediction for the file based on the predicted set of OPR values; and
   predicting a battery life based on a battery charge and the power prediction for the file.

2. The method of claim 1, wherein determining a set of on-pixel ratio (OPR) profiles in a database to determine if an OPR profile for the file is stored in the database comprises comparing file metadata for the file with OPR profile metadata.

3. The method of claim 1, wherein determining OPR values for the file to generate a session time series comprises:
    determining a file type;
    if the file type is static, reading frame data for the file to determine the session time series;
    if the file type is dynamic, periodically measuring OPR values to create the session time series.

4. The method of claim 3, further comprising updating the OPR file in the database based on the session time series if the file type is dynamic.

5. The method of claim 3, further comprising:
    if the content type is dynamic:
        measuring the OPR data; and
        adding the session time series to the OPR profile as a stored time series.

6. The method of claim 1, wherein comparing the session time series to a stored time series comprises determining a confidence level to determine if the session time series matches the stored time series.

7. The method of claim 6, wherein determining a confidence level comprises comparing a relative values of a brightness level and a color level of the session time series to relative values of a brightness level and a color level of the stored time series.

8. The method of claim 1, further comprising determining a list of applications or files executable by the portable information handling system for the predicted battery life.

9. The method of claim 8, further comprising displaying one or more of a notification of the predicted battery life or a list of applications or files executable by the portable information handling system for the predicted battery life.

10. A system for predicting battery life for a battery in a portable information handling system, the system comprising:
    a processor; and
    a memory medium in the portable IHS, the memory medium comprising a set of instructions executable by the processor to cause the processor to:
        in response to receiving an input from a user interface, initiate a session on the portable information handling system, wherein the input includes an indication of an application to be executed by the information handling system and a file associated with the application:
        search a set of on-pixel ratio (OPR) profiles in a database in the memory medium to determine if an OPR profile for the file is stored in the database, wherein each stored OPR profile comprises one or more stored time series, wherein each stored time series corresponds to one instance of the application processing the file;
        during execution of the application, determine OPR values to generate a session time series associated with the file;
        compare the session time series to a stored time series to determine if the session time series matches the stored time series, wherein:
            if the session time series matches the stored time series, the processor is configured to predict a set of OPR values for the file based on a set of historic OPR values from the stored time series; or
            if the session time series does not match the stored time series, the processor is configured to predict the set of OPR values for the file using data forecasting applied to the determined OPR values;
        calculate a power prediction for the file based on the predicted set of OPR values; and
        predict a battery life based on a battery charge and the power prediction for the file.

11. The system of claim 10, wherein the set of instructions are executable by the processor to cause the processor to compare file metadata for the file with OPR profile metadata for each OPR profile to determine if an OPR profile for the file is stored in the database.

12. The system of claim 10, wherein the set of instructions are executable by the processor to cause the processor to:
    determine a file type;
    if the file type is static, read frame data for the file to determine the session time series;
    if the file type is dynamic, periodically measure OPR data to determine the session time series.

13. The system of claim 10, wherein the set of instructions are executable by the processor to cause the processor to determine a confidence level to determine if the session time series matches the stored time series.

14. The system of claim 13, wherein the set of instructions are executable by the processor to cause the processor to compare relative values for a brightness level and a color level of the session time series to relative values of a brightness level and a color level of the stored time series to determine the confidence level.

15. The system of claim 10, wherein the set of instructions are executable by the processor to cause the processor to update the OPR file in the database based on the session time series if the content type is static.

16. The system of claim 10, wherein the set of instructions are executable by the processor to cause the processor to measure the OPR values and add the session time series to the OPR profile if the file type is dynamic.

17. The system of claim 10, wherein the set of instructions are executable by the processor to cause the processor to determine a list of applications or files executable by the portable information handling system for the predicted battery life.

18. The system of claim 17, wherein the set of instructions are executable by the processor to cause the processor to display one or more of a notification of the predicted battery life or a list of applications or files executable by the portable information handling system for the predicted battery life.

* * * * *